May 22, 1956     W. WOITUK     2,746,818

NON-EXPANDABLE PISTON

Filed May 18, 1955

Inventor
WILLIAM WOITUK
By Alan Ainsley
Attorney

United States Patent Office 2,746,818
Patented May 22, 1956

2,746,818

NON-EXPANDABLE PISTON

William Woituk, Montreal, Quebec, Canada

Application May 18, 1955, Serial No. 509,309

10 Claims. (Cl. 309—15)

The present invention relates to improvements in pistons and more particularly to improvements in pistons intended for use in internal combustion engines.

As is well known, the conventional internal combustion engine utilizes one or more cylinders in which a piston or pistons are reciprocated by the explosion of a mixture of combustible fuel in such a manner as the pistons are driven downwardly to revolve the crank shaft. The piston or pistons are connected to the driving crank shaft by piston rods.

As the piston must reciprocate in the cylinder and since the combustion chamber between the upper face of the piston and the top wall of the cylinder must be as nearly gastight as possible, the external diameter of the piston and the internal diameter of the cylinders must be in direct proportion to ensure the effective seal required.

With this in mind, and since most of the known piston constructions mainly comprise of a solid metal body of cylindrical formation, these must be carefully machined and provided with separate oil sealing rings which cooperate between the piston and the inner wall of the cylinder. The fit or tolerance between piston and cylinder requires initial accurate machining and fitting.

Since the piston comprises of a relatively solid mass of metal, the question of expansion and contraction is an important one when considering the effective life of the piston and maintenance.

Various expedients have been tried to provide a non-expandable piston, for example, pistons have been made solely of non-metallic material, that is with respect to the main body of the piston, in order to overcome the problem of expansion.

Most of these prior art attempts to overcome this problem have encountered other difficulties and present other disadvantages in that where complete non-metallic piston bodies have been utilized, the problem of excessive wear and warpage or distortion of the cylinder body has arisen. In other attempts to overcome this problem by the provision of pistons having adjustable side walls, the resultant structure is in most cases so complicated that it has been considered impractical from the manufacturing viewpoint.

The present invention aims to provide a composite non-expandable piston which is designed to overcome the problems mentioned above.

Essentially, the present invention contemplates the manufacture of pistons which are made up of a plurality of interconnected segments. For this purpose, the main body of the piston is constructed of a thermally inert material, with regard to expansion or contraction, for example, Fiberglas, asbestos, or the like. An outer piston sleeve is made in the form of a two-piece cylindrical shell, preferably of aluminum, which fits over the central mass of inert material with provision being made for the location of the outer shell and provide a bearing means for the wrist pin in the form of an inserted metallic block, also preferably of aluminum. The upper end of the present piston construction is made up of a relatively heavy metallic disc which is shaped to hold the usual lubricating rings. A bottom base plate is provided, also of metal, with the whole assembly held together by elongated tie rods or studs.

Having thus generally described the nature of the invention, particular reference will be made to the accompanying drawings, wherein there is shown by way of illustration a preferred embodiment thereof, and in which.

Figure 1:
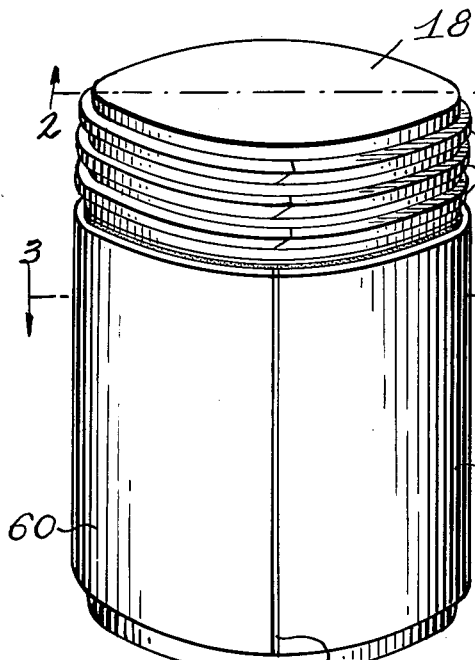
Figure 1 is a side view in somewhat perspective elevation of a composite piston constructed in accordance with the invention with the upper end of a piston rod shown in assembled condition.
Figure 2:
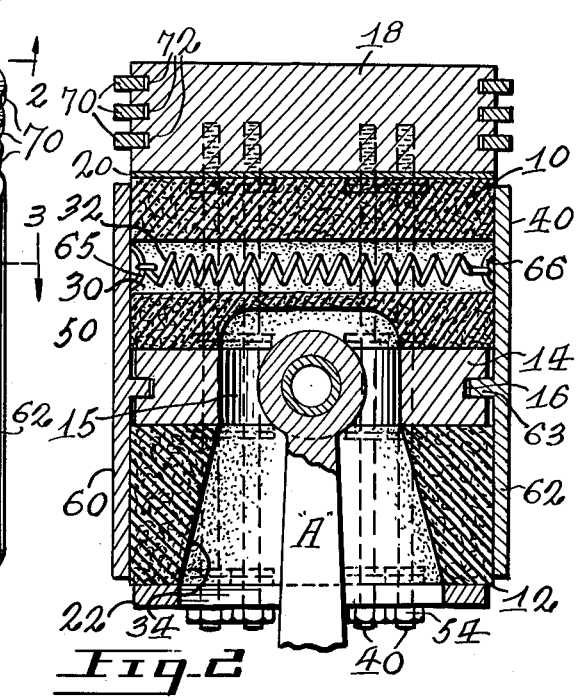
Figure 2 is a cross sectional view of the construction shown in Figure 1 along line 2—2.
Figure 4:
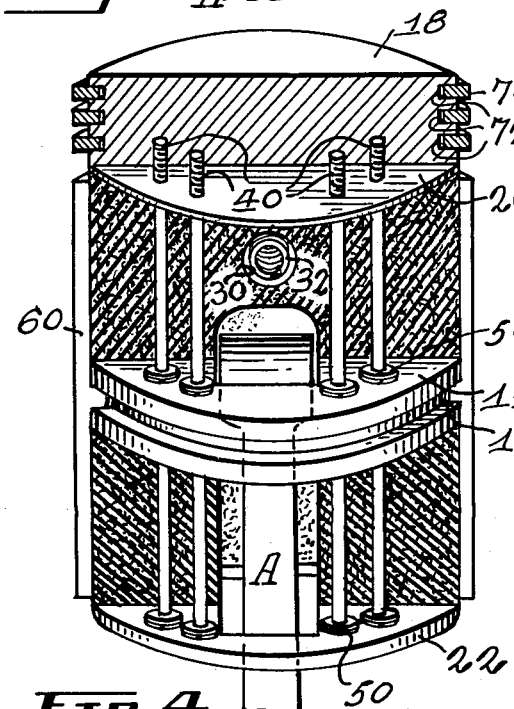
Figure 4 is a view corresponding in location to Figure 1 with portions of the outside shell and the main inert body removed to show the relative position of the top disc, spacing layer, central wrist pin bearing and retaining studs.

With particular reference to the drawings, the main body of a composite piston in accordance with the invention comprises of two cylindrical blocks, 10 and 12, of non-metallic material having the desired inert or non-expanding characteristics required, for example, moulded blocks of Fiberglas or asbestos or like material.

A centre block of metal, preferably aluminum, is interposed between the blocks 10 and 12 to provide a means for supporting and providing a bearing for the wrist pin attaching the connecting rod to the piston.

The centre block 14 includes an annular groove 16 about the outer periphery with the centre portion of the block being relieved or cut out as indicated at 15 to provide the necessary clearance for the connecting rod movements.

A piston head 18, comprising of a further relatively thick cylindrical disc, also preferably of aluminum, is mounted over the top portion 10 of the main body of the piston with a thin flat disc 20, preferably of copper, interposed therebetween to absorb heat transmitted by the cylinder head 18. A lower or base disc 22 is provided at the bottom of the lower cylinder portion 12 to complete the composite make up of the piston body.

The top cylinder portion 10 also includes a transverse boring 30 which is adapted to accommodate a resilient coil spring 32, as will be described in more detail later. The lower portion of the body portion 10 is inwardly recessed to provide clearance for the top of the connecting rod "A" while the lower body portion 12 includes a relatively narrow tapered recess 34 to provide clearance for the oscillating or swinging movements of the upper end of the connecting rod "A."

Figure 3:
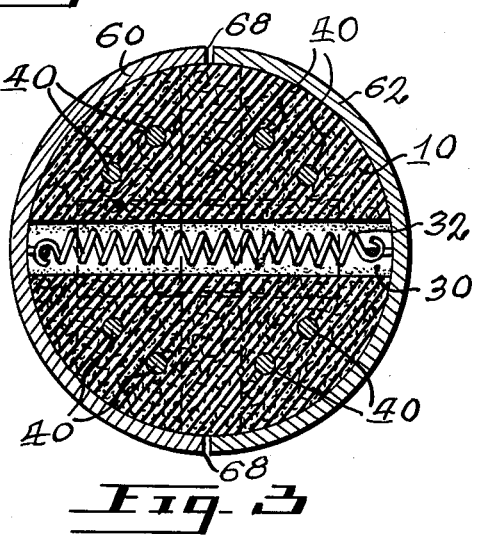
Figure 3 is a transverse cross section of the construction shown in Figure 1 along line 3—3.

The elements 18, 20, 10, 14, 12 and 22 are assembled together in the following manner:

The top or head 18 is bored and tapped to provide a series of spaced apart threaded openings arranged as shown in Figure 3, which are adapted to receive the threaded ends of a plurality of elongated studs 40, eight (8) in the present construction. The plate 20, the body portion 10, centre portion 14, lower body portion 12 and the base plate 22 are correspondingly bored so as to allow the elongated studs 40 to pass completely therethrough. Preferably, lock washers 50 are placed over the studs 40 adjacent the plate 20 and at each side of the centre portion 14 and also adjacent the base plate 22 as the units are being assembled.

The body portions 10 and 12 are recessed above the stud openings so that the lock washers 50 will be accommodated and allow the body portions 10 and 12 to be pulled snugly against the top end and base plate and the centre portion 14. Suitable retaining nuts 54 are mounted over the lower ends of the studs 40 so as to complete the assembly.

The main outer shell of the piston construction comprises two identical relatively thin metallic sleeve portions 60, 62 of semi-circular formation and preferably of aluminum. Each portion 60, 62 includes an inwardly extending flange 61, 63, respectively, which fits into the annular groove 16 provided on the central portion 14. This provides a means of accurately locating and aligning the sleeve portions 60, 62. As mentioned above, a resilient coil spring 32 is provided which extends through the boring 30 of the upper body portion 10. Each terminal end of the spring 32 is engaged with an eye provided on each of the sleeve portions 60, 62. The portion 60 is provided with an eye 65 while the portion 62 is provided with a corresponding eye 66.

This arrangement provides a means of resiliently retaining the piston side sleeve portions 60, 62 in their proper position while the piston is being fitted to the cylinder for which it is intended. As will be appreciated, once the piston is in place, it will be impossible to displace the piston side wall portions 60, 62, since they will be positively aligned by the flanges 61, 63 engaged in the groove 16 of the centre portion 14.

Since there may be a slight expansion of the metallic piston sleeve portions 60, 62, the adjacent marginal edges of the two portions do not quite meet but a slight gap 68 is left at each side. Corresponding expansion gaps are left at the upper and lower margins of the sleeve portions 60, 62 relative to the piston head portions 18 and the base plate 22. As usual, sealing rings 70 are mounted in grooves 72 provided in the head portion 18.

With this arrangement, it is contemplated that it is possible to produce a piston which can fit within a cylinder with a clearance of about .0005. Due to the composite construction with the main body of the piston comprising of non-expandable material, the composite piston will not expand more than .0005 in operation and therefore maintain its perfect fit without allowing leakage of gases and fluid or causing abrasion of the side walls of the piston and/or cylinder as is often encountered when the usual solid type piston becomes worn and loose fitting.

The gaps placed between the piston sleeve portions 60, 62 are preferably about 1/32 of an inch while the fit between the tongue portions 61, 63 of the sleeve portions and the annular groove 16 of the centre portion 14 is preferably about .0005. The inner face of the tongue or flanges 61, 63 does not meet the bottom of the groove 16 by about 1/32 of an inch so as to provide a means to compensate for slight transaxial expansion of the flange under operating conditions.

It will be appreciated that while the preferred metal mentioned for the piston head 18, the cylindrical sleeves 60, 62, centre block 14 and base plate 22 is aluminum, other suitable materials could be utilized for this purpose, for example, suitable steel alloys might be employed.

I claim:

1. A composite piston for internal combustion engines comprising a main cylindrical body of two-piece construction of non-metallic material, a metallic centre portion extending trans-axially between said non-metallic body portions, a metallic piston head and a metallic piston base, said head, body portions, centre portion and base being interconnected and retained together in concentric axial alignment by a plurality of spaced apart elongated studs extending from said head to said base plate, and a metallic outer sleeve surrounding said non-metallic body and centre portion and extending from adjacent said base to adjacent said head.

2. A composite piston as claimed in claim 1 wherein said outer sleeve is in two equal parts of semi-circular outline.

3. A composite piston as claimed in claim 1 wherein said metallic centre body portion includes an annular groove and said outer sleeve includes an inwardly extending annular flange fitting in said annular groove.

4. A composite piston as claimed in claim 2 wherein said outer sleeve portions are resiliently biased towards each other.

5. A composite piston as claimed in claim 1 wherein said non-metallic piston body is made up of moulded cylindrical blocks of material having thermally inert characteristics with regard to expansion and contraction.

6. A composite piston for internal combustion engines comprising a main cylindrical body made up of a plurality of non-metallic cylindrical segments, a metallic bearing member of cylindrical formation disposed between said non-metallic segments, a metallic piston head of cylindrical formation disposed above said non-metallic segments, a metallic piston base of cylindrical formation disposed beneath said non-metallic segments, said piston head, body segments, bearing member and base being aligned in concentric axial relationship and secured together by a plurality of circumferentially spaced apart elongated studs extending from said piston head to said piston base, and a metallic outer sleeve of cylindrical formation surrounding said non-metallic body and bearing member and extending from adjacent said piston head to adjacent said piston base.

7. A composite piston as claimed in claim 6 wherein said piston base, bearing member and non-metallic body segments above and below said bearing member are recessed centrally to accommodate a connecting rod.

8. A composite piston as claimed in claim 6 wherein said metallic centre body portion includes an annular groove and said outer sleeve includes an inwardly extending annular flange fitting in said annular groove.

9. A composite piston as claimed in claim 6 wherein said outer sleeve is in two equal portions, and said portions are resiliently biased towards each other.

10. A composite piston as claimed in claim 6 wherein said non-metallic piston body is made up of moulded cylindrical blocks of material having thermally inert characteristics with regard to expansion and contraction.

References Cited in the file of this patent

UNITED STATES PATENTS

| | | |
|---|---|---|
| 1,283,865 | Nacker | Nov. 5, 1918 |
| 1,294,956 | Schou | Feb. 18, 1919 |
| 1,386,144 | Wall | Aug. 2, 1921 |
| 1,398,178 | Lukacsevics et al. | Nov. 22, 1921 |
| 1,609,449 | Williams | Dec. 7, 1926 |